US008517832B2

(12) United States Patent
Loose et al.

(10) Patent No.: US 8,517,832 B2
(45) Date of Patent: Aug. 27, 2013

(54) DIGITAL AUDIO IN A WAGERING GAME SYSTEM

(75) Inventors: Timothy C. Loose, Chicago, IL (US); Stephen A. Canterbury, Antioch, IL (US)

(73) Assignee: WMS Gaming Inc., Waukegan, IL (US)

( * ) Notice: Subject to any disclaimer, the term of this patent is extended or adjusted under 35 U.S.C. 154(b) by 1148 days.

(21) Appl. No.: 11/241,235

(22) Filed: Sep. 30, 2005

(65) Prior Publication Data

US 2006/0100015 A1 May 11, 2006

Related U.S. Application Data

(60) Provisional application No. 60/615,217, filed on Oct. 1, 2004.

(51) Int. Cl.
*A63F 9/24* (2006.01)
*G06F 13/00* (2006.01)

(52) U.S. Cl.
USPC ................................ 463/35; 463/16; 381/104

(58) Field of Classification Search
None
See application file for complete search history.

(56) References Cited

U.S. PATENT DOCUMENTS

| | | | | |
|---|---|---|---|---|
| 4,272,649 | A * | 6/1981 | Pfeiffer | 704/258 |
| 5,691,245 | A * | 11/1997 | Bakhit et al. | 216/20 |
| 6,081,783 | A * | 6/2000 | Divine et al. | 704/500 |
| 6,146,276 | A * | 11/2000 | Okuniewicz | 463/35 |
| 6,379,246 | B1 * | 4/2002 | Dabrowski | 463/16 |
| 6,394,900 | B1 * | 5/2002 | McGlone et al. | 463/20 |
| 6,805,633 | B2 * | 10/2004 | Hein et al. | 463/35 |
| 7,241,219 | B2 * | 7/2007 | Walker et al. | 463/20 |
| 2002/0147047 | A1 * | 10/2002 | Letovsky et al. | 463/42 |
| 2002/0151347 | A1 * | 10/2002 | Jorasch et al. | 463/20 |
| 2003/0003988 | A1 * | 1/2003 | Walker et al. | 463/21 |
| 2003/0054881 | A1 * | 3/2003 | Hedrick et al. | 463/29 |
| 2003/0115137 | A1 * | 6/2003 | Rowe | 705/39 |
| 2003/0119575 | A1 * | 6/2003 | Centuori et al. | 463/20 |
| 2003/0199320 | A1 * | 10/2003 | Nguyen et al. | 463/42 |
| 2004/0005918 | A1 * | 1/2004 | Walker et al. | 463/16 |
| 2004/0106454 | A1 * | 6/2004 | Walker et al. | 463/42 |
| 2004/0142747 | A1 * | 7/2004 | Pryzby | 463/35 |
| 2004/0179701 | A1 * | 9/2004 | Boyd | 381/104 |
| 2004/0242304 | A1 * | 12/2004 | Walker et al. | 463/16 |
| 2004/0254014 | A1 * | 12/2004 | Quraishi et al. | 463/29 |
| 2005/0043090 | A1 * | 2/2005 | Pryzby et al. | 463/35 |
| 2005/0113173 | A1 * | 5/2005 | Waters | 463/43 |
| 2006/0014586 | A1 * | 1/2006 | Gatto et al. | 463/46 |
| 2006/0095623 | A1 * | 5/2006 | Nio et al. | 710/260 |
| 2006/0123449 | A1 * | 6/2006 | Ma et al. | 725/58 |

* cited by examiner

*Primary Examiner* — Paul A D'Agostino

(74) *Attorney, Agent, or Firm* — Schwegman Lundberg Woessner, P.A.

(57) ABSTRACT

A computerized wagering game system a gaming module comprising a processor and gaming code which is operable when executed on the processor to present a wagering game on which monetary value can be wagered, and an audio module operable to exchange digital audio data with an audio device over a digital audio format link. The digital audio format link in various embodiments comprises a SPDIF link, an AES/EBU link, an HDMI link, or an I2S link.

37 Claims, 4 Drawing Sheets

DIGITAL AUDIO IN A WAGERING GAME SYSTEM

RELATED APPLICATIONS

This application claims priority under 35 U.S.C. 119(e) from U.S. Provisional Application Ser. No. 60/615,217 filed 1 Oct. 2004, which application is incorporated herein by reference.

FIELD OF THE INVENTION

The invention relates generally to wagering gaming systems, and more specifically to use of digital audio in a wagering game machine.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND OF THE INVENTION

A wide variety of gaming devices are now available to gamers and to casino operators in computerized form, from slot machines to games that are traditionally played live such as poker and blackjack. These computerized games provide many benefits to the game owner and to the gambler, including greater reliability than can be achieved with a mechanical game or human dealer, more variety, sound, and animation in presentation of a game, and a lower overall cost of production and management.

Computerized video game systems must be designed with many of the same concerns as their mechanical and table game ancestors—they must be fair, they must provide sufficient feedback to the gamer to make the game fun to play, and they must meet a variety of gaming regulations to ensure that both the machine owner and gamer are honest and fairly treated in implementing the game. Further, they must provide a gaming experience that is at least as attractive as the older mechanical gaming machine experience to the gamer, to ensure success in a competitive gaming market.

Many computerized wagering game systems have a variety of sound and graphical elements designed to attract and keep a game player's attention, such as sound effects, music, and animation. These game presentation features often include a variety of music, sound effects, and voices presented to complement a video presentation of the wagering game on a display.

But, as wagering game systems evolve and audio technology progresses, it can become difficult to interface older technology with new technology. For example, sending an audio signal from one device to another requires that it be sent in a format recognized by both devices, which traditionally means that it is sent as a "line-level" analog audio signal. But analog signals are subject to noise and other interference in a computerized system employing digital electronics, lights, and other devices that produce electrical interference, and so can reduce or degrade the quality of the signal.

It is therefore desired to interface audio components using superior technologies in a wagering game machine.

SUMMARY OF THE INVENTION

The present invention provides in one embodiment a computerized wagering game system having a gaming module comprising a processor and gaming code which is operable when executed on the processor to present a wagering game on which monetary value can be wagered, and an audio module operable to exchange digital audio data with an audio device over a digital audio format link. The digital audio format link in various embodiments comprises a SPDIF link, an AES/EBU link, an HDMI link, or an I2S link, or a digital audio signal carried over another link such as a USB link.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention provides in one embodiment a computerized wagering game system having a gaming module comprising a processor and gaming code which is operable when executed on the processor to conduct a wagering game on which monetary value can be wagered, and an audio module operable to exchange digital audio data with an audio device over a digital link supporting a digital audio format. The digital audio format link in various embodiments comprises a SPDIF link, an AES/EBU link, an HDMI link, or an I2S link, and is used to facilitate digital transfer of audio data from one electronic component or device to another electronic component or device in the wagering game system.

Figure 1:
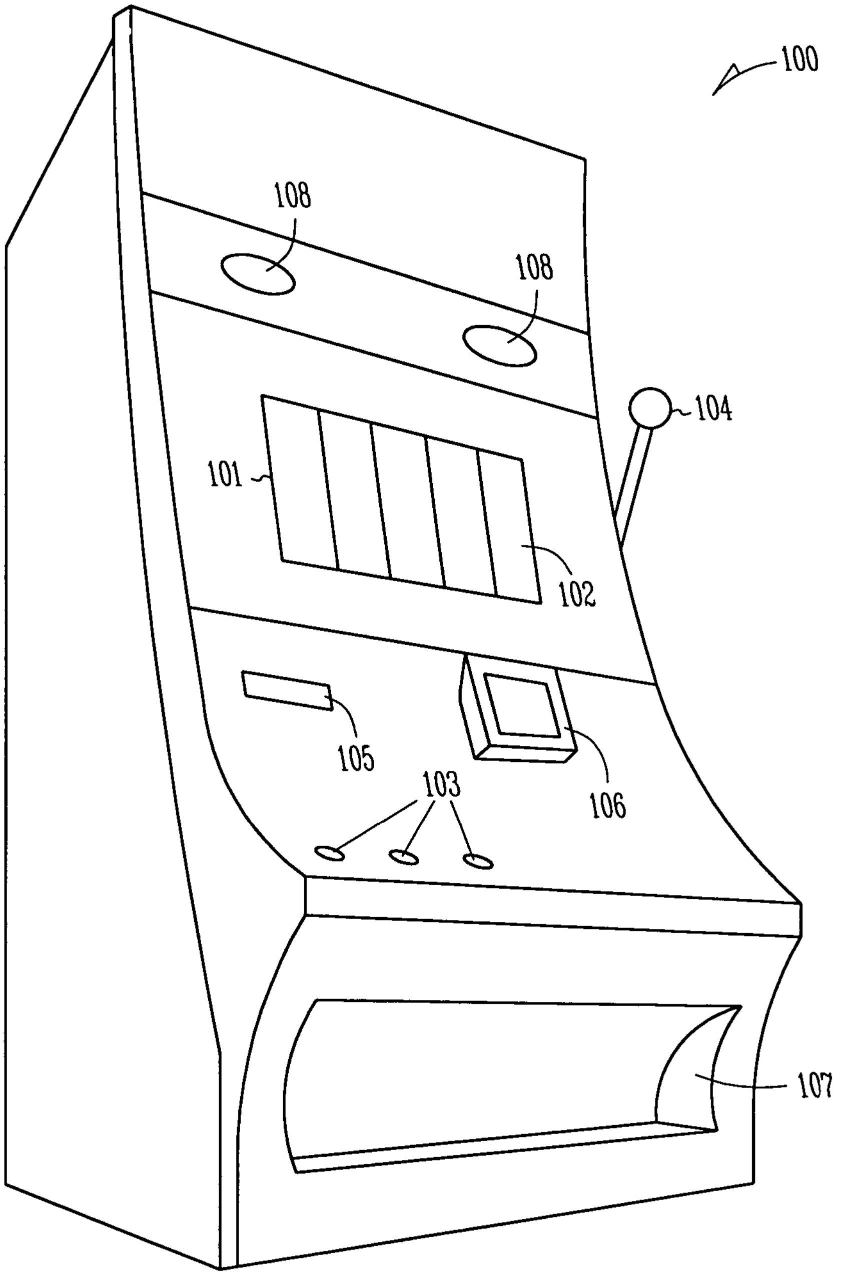
FIG. 1 shows a computerized reel slot gaming system having audio crosstalk cancellation, consistent with an embodiment of the invention.

FIG. 1 illustrates a computerized wagering game machine system, as may be used to practice various embodiments of the present invention. The computerized gaming system shown generally at 100 is a video wagering game system, which displays information for at least one wagering game upon which monetary value can be wagered on touchscreen video display 101. The touchscreen video display 101 is in various embodiments a CRT display, a plasma display, an LCD display, a field emission display, or any other type of display suitable for displaying electronically provided display information. Further embodiments include alternate or additional displays which may or may not be touchscreen displays, such as a second display located above the primary display, or other displays coupled to the wagering game system. Alternate embodiments of the invention will include other game indicators, such as mechanical reels instead of or in addition to the video graphics reels shown at 102 that comprise a part of a video slot machine wagering game.

A game of chance is implemented using software within the wagering game, such as through instructions stored on a machine-readable medium such as a hard disk drive or nonvolatile memory. In some further example embodiments, some or all of the software stored in the wagering game machine is encrypted or is verified using a hash algorithm or encryption algorithm to ensure its authenticity and to verify that it has not been altered. For example, in one embodiment the wagering game software is loaded from nonvolatile memory in a compact flash card, and a hash value is calculated or a digital signature is derived to confirm that the data stored on the compact flash card has not been altered. The game of chance implemented via the loaded software takes various forms in different wagering game machines, including such well-known wagering games as reel slots, video poker, blackjack, craps, roulette, or hold'em games. The wagering game is played and controlled with inputs such as various buttons 103 or via the touchscreen video display 101. In some alternate examples, other devices such as pull arm 104 used to initiate reel spin in this reel slot machine example are employed to provide other input interfaces to the game player.

Monetary value is typically wagered on the outcome of the games, such as with tokens, coins, bills, or cards that hold monetary value. The wagered value is conveyed to the machine through a changer 105 or a secure user identification module interface 106, and winnings are returned via the returned value card or through the coin tray 107. Sound is also provided through speakers 108, typically including audio indicators of game play, such as reel spins, credit bang-ups, and environmental or other sound effects or music to provide entertainment consistent with a theme of the computerized wagering game. In some further embodiments, the wagering game machine is coupled to a network, and is operable to use its network connection to receive wagering game data, track players and monetary value associated with a player, and to perform other such functions.

Audio presented to the wagering game player is typically presented through speakers 108, but in various embodiments of the invention is also provided as an audio output signal that can be received in another audio device, such as via a digital audio output. Other embodiments of the invention incorporate a digital audio input, such as may be used to receive digital audio signals from digital audio devices such as a CD or DVD player, an MP3 or other music player, or a digital audio distribution network. Exchanging digital data with a digital audio device includes receiving digital audio data, sending digital audio data, or both sending and receiving digital audio data in various embodiments of the invention.

Use of a digital audio stream provides compatibility with an ever-increasing number of digital audio components, and reduces the chance that an analog audio signal will be degraded by noise or other interference. The digital audio signal comprises in some embodiments a signal comprising one of two distinct voltage levels, where the changes between voltage level over time represent encoded samples or audio amplitude values. These digital audio signals can be converted to analog audio for playback through a speaker or headphones via a digital-to-analog converter, and by related circuitry that provides filtering, timing, and other functions.

Figure 2:
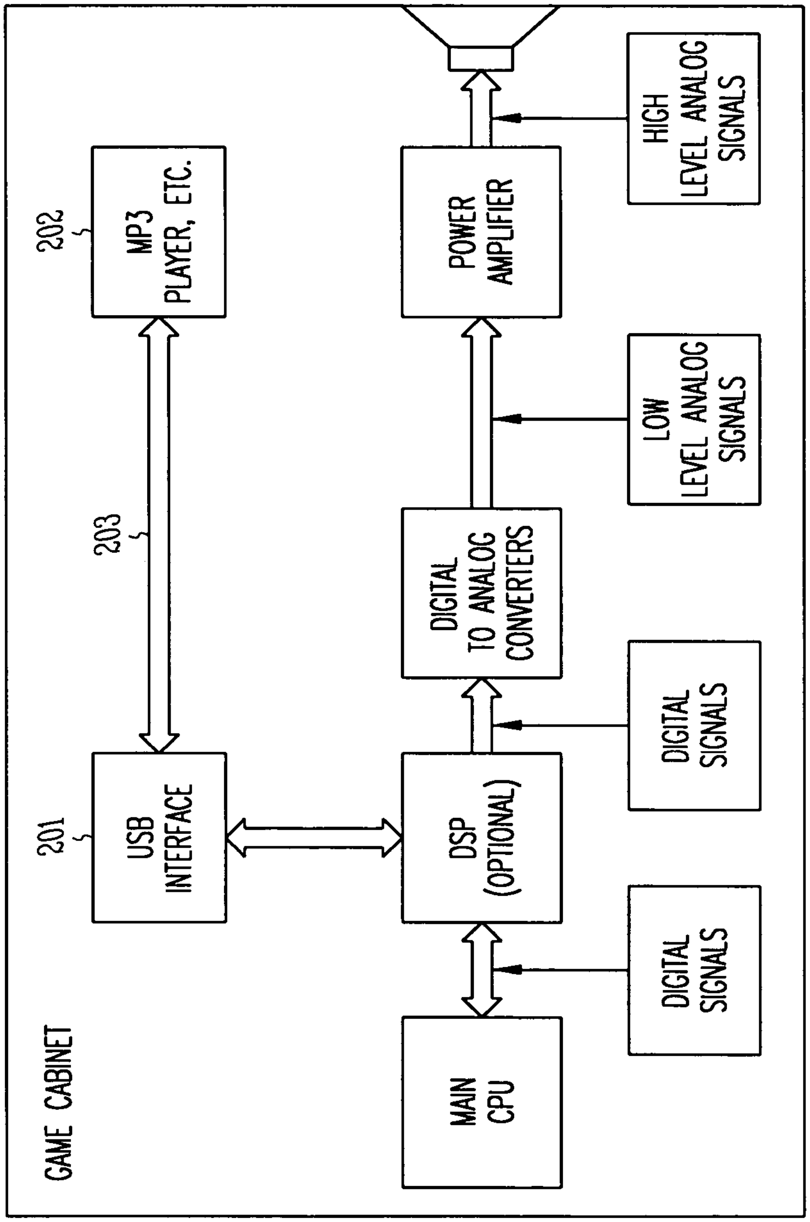
FIG. 2 is a flowchart illustrating a wagering game machine having a digital audio connection to an internal digital audio device, consistent with an embodiment of the invention.

FIG. 2 shows an example of a digital audio input/output internal to a wagering game machine, linking a digital audio device such as an MP3 player to a USB interface. In some embodiments, the USB interface 201 is coupled to a digital audio device 202 via a USB connection that serves as a carrier for encoded digital audio. In other embodiments, the USB port 201 or other interface is coupled to a digital format input/output link that couples to a compatible digital audio interface on the digital audio device. Digital audio links include formats such as SPDIF, AES/EBU, HDMI, and other digital links designed to carry digital audio signals.

The USB interface is absent entirely in still other embodiments, and is replaced with an audio adapter having a digital interface. For example, many commercially available sound cards or adapters, and many commercially available computer audio chipsets support digital audio in one or more formats, such as SPDIF or AES/EBU. This enables direct connection of a digital audio device to the wagering game's audio components, using an interface that is widely used, is robust, and is secure.

Figure 3:
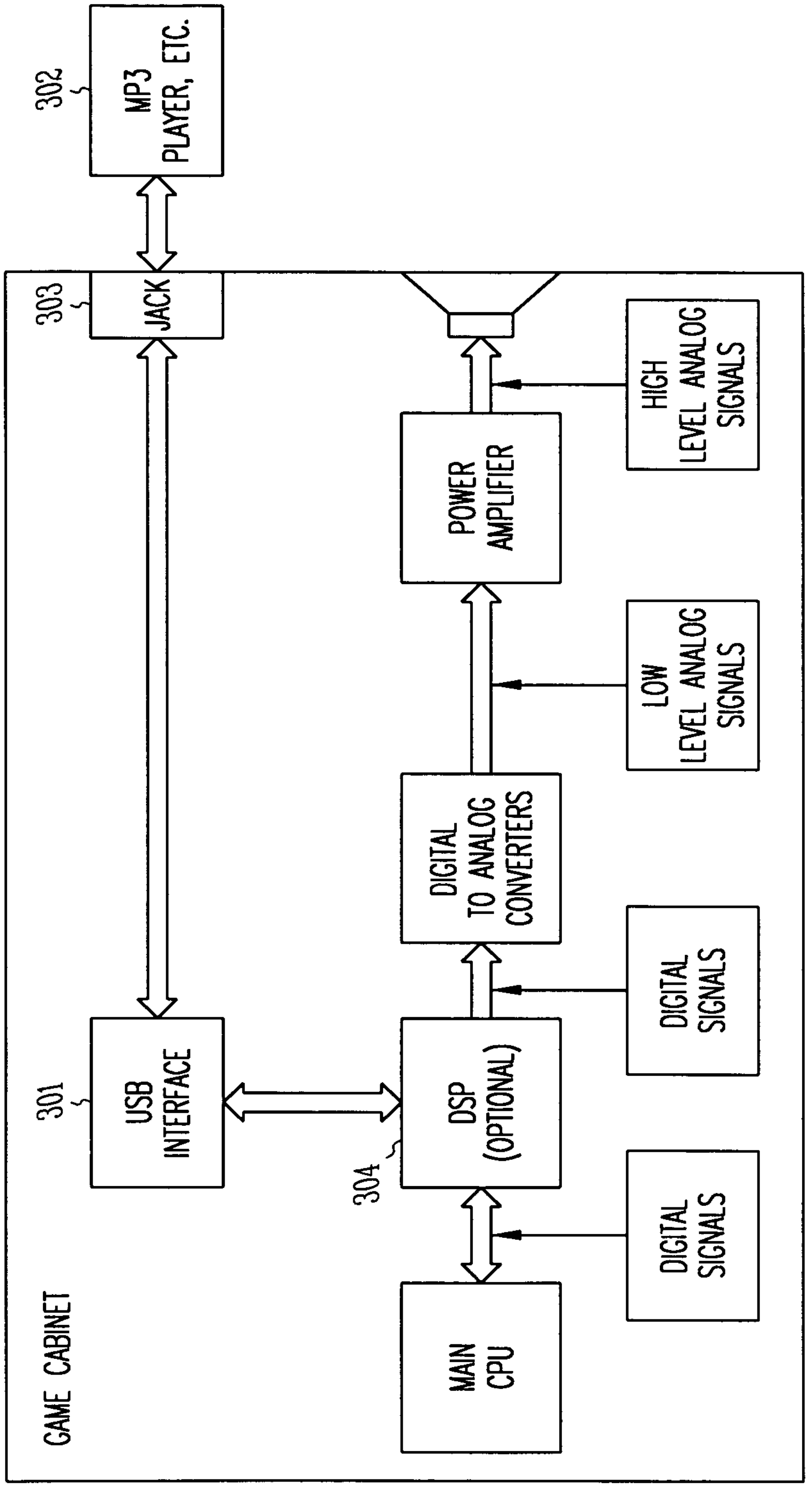
FIG. 3 is a flowchart illustrating a wagering game machine having a digital audio connection to an external digital audio device, consistent with an embodiment of the invention.

The digital audio I/O enables a wagering game provider to provide digital audio content to a wagering game machine in a format that doesn't require authentication or verification, as does most code or other digital data stored in a wagering game machine. Because the interface is an audio interface and does not carry program code or other such data to the processor, wagering game machine designers can incorporate digital audio devices having replaceable or reconfigurable media, or can in embodiments such as that of FIG. 3 provide a digital interface to an environment outside the wagering game machine. This enables incorporation of devices such as CD players or other audio players in which an operator can replace the media to update the machine, or can insert seasonally appropriate audio programming into the digital audio device. For example, an audio content compact disc can be replaced with a compact disc having Christmas-themed music during the holiday season without requiring regulatory approval that would be needed for changing the content of the code stored in the wagering game machine.

FIG. 3 shows an embodiment of the invention in which the digital audio interface enables outside devices to interface with the wagering game machine, such as a wagering game player's personal Apple IPod or other similar audio device supporting digital audio output. In some embodiments, this enables a wagering game player to use the player's own audio device to provide input to the wagering game machine that is then played through the wagering game machine's audio system. In other embodiments, the digital interface enables the wagering game player to receive digital audio content from the wagering game, such as promotional material or digital audio content the game player has won or purchased.

The USB interface 301 of FIG. 3 is connected to the external digital audio device 302 via an electrical jack 303, allowing the external device to exchange digital audio data with the wagering game system. In one such example, the jack 303 is a USB jack that provides a medium over which audio that is encoded digitally can be conveyed, such that the USB interface, a digital signal processor 304, or other such component is able to extract the digital audio information from the digital data conveyed over the USB interface.

In a further embodiment, the USB interface 301 is replaced with an audio processor, which in an alternate embodiment is a part of digital signal processor 304, which is operable to exchange digital audio information with another digital audio device. The jack 303 in some such embodiments is a digital audio interface jack, such as a Toslink optical digital audio jack, or an RCA digital audio jack, configured to couple to a digital audio device. Some digital audio standards specify the jack type, such as the Toslink jack for optical digital audio signals, and some further specify electrical parameters such as a 75 Ohm or 110 Ohm impedance for connecting cables. For example, the AES/EBU digital audio standard includes a specified cable and termination impedance of 110 Ohms, and a two-to-seven Volt peak-to-peak signal level. The SPDIF standard, which is more common in consumer applications such as portable digital audio devices, specifies a single-ended 75 Ohm cable and RCA or phono plugs and jacks for interconnection, and a 0.5 Volt peak-to-peak signal level when using an electrical interface. Alternately, a Toslink optical interface can be used for SPDIF, and converters from electrical to optical and optical to electrical can be easily incorporated into the jack 303 and are widely commercially available.

Figure 4:
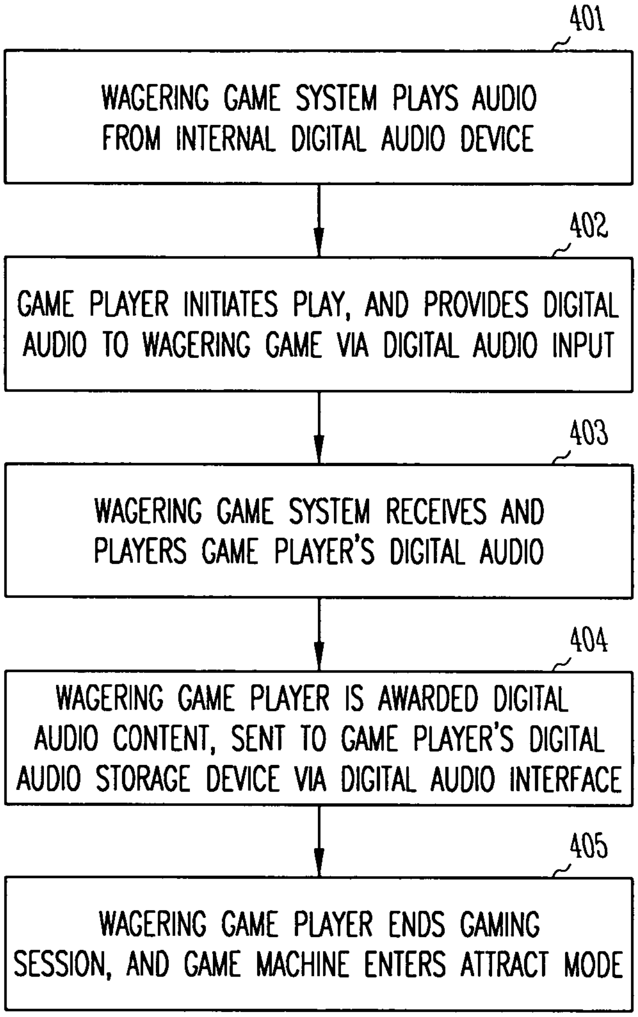
FIG. 4 is a flowchart of a method of using digital audio connections in a wagering game system, consistent with an embodiment of the invention.

FIG. 4 is a flowchart of a method of practicing one example embodiment of the invention. At 401, a wagering game plays music from a seasonal compact disc coupled to the wagering game system via an internal digital audio link, as shown in greater detail in FIG. 2. In some embodiments, the wagering game is in attract mode at this point, or is being played by a wagering game player who has not provided his own digital audio. At 402, the game player couples a digital audio device such as a portable digital audio player to a wagering game system digital interface operable to convey a digital audio signal, such as an SPDIF digital audio interface or USB interface, and sends digital audio data to the wagering game system.

The wagering game system receives the digital audio content from the wagering game player's digital audio device, and plays it during game play at 403. In various embodiments, the volume of the digital audio playback is varied during the wagering game, such as to reduce the volume during bonus sounds, instructional sounds, or other important sounds, and to increase the volume during less active periods in game play.

The wagering game player continues to play until awarded digital audio content at 404, such as a free song or music video from a catalog of music. The digital audio content is then sent to the wagering game player's portable digital audio device, where it can be stored and from which it can be played. Once the wagering game player has finished game play, the wagering game player disconnects the attached digital audio device, and the wagering game returns to attract mode at 405.

In one example application of the invention, a user is able to plug an external digital audio player into the wagering game via a digital audio interface jack as shown at 303 of FIG. 3. The digital audio interface jack receives digital audio signals from the digital audio player in a format such as via SPDIF, and is able via a digital signal processor 304 or other audio circuitry to play the audio through one or more speakers so that a game player is able to select and provide the music played during at least some portion of the wagering game.

In another embodiment, a USB interface or other digital interface operable to convey a digitally encoded audio signal is operable to send digital audio from the wagering game system to a wagering game player's digital audio device, such as to provide a song, album, video clip, or other digital audio to the wagering game player for later use. In one such example, free songs are awarded based on a certain number of credits wagered, time played, or other such factors, and the songs are provided to the game player via a digital interface. The digital audio content provided to the game player may be selected from a list, may be selected consistent with a theme of the wagering game, or can be provided via another mechanism or for another purpose in various embodiments.

The examples presented here have illustrated how a digital interface operable to convey digital audio information can be used in a wagering game machine to provide higher quality and greater connectivity than with analog audio interfaces, and further how such an interface can be used to transfer digital audio to another device such as to send a song to a wagering game player's digital audio player. A variety of formats have been illustrated, including digital audio-specific electrical connections and sending digital audio over a general-purpose electrical connection such as USB. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

The invention claimed is:

1. A computerized wagering game system, comprising:

a gaming module comprising a processor and gaming code which is operable when executed on the processor to present a wagering game on which monetary value can be wagered; and an audio module operable to receive digital audio data from an external audio device over a digital audio format link suitable to carry digital audio data, the audio module further operable to receive the digital audio data and to play both the digital audio data and audio data from a wagering game audio source during game play of the wagering game, and further operable to determine a played volume of the digital audio data and a played volume of the audio data from the wagering game audio source in accordance with a game play period.

2. The computerized wagering game system of claim 1, wherein the digital audio format link is AES/EBU.

3. The computerized wagering game system of claim 1, wherein the digital audio format link is SPDIF.

4. The computerized wagering game system of claim 1, wherein the digital audio format link is HDMI.

5. The computerized wagering game system of claim 1, wherein the digital audio format link is I2S.

6. The computerized wagering game system of claim 1, wherein the audio module comprises an analog-to-digital converter in the digital audio format link operable to convert an analog signal received in the audio module to a digital audio format signal.

7. The computerized wagering game system of claim 1, wherein the audio module comprises a digital-to-analog converter in the digital audio format link operable to convert a digital signal received from the audio module to an analog signal.

8. A method of operating a computerized wagering game machine, comprising:

presenting a wagering game on which monetary value can be wagered;

receiving digital audio data from an external audio device over a digital audio format link suitable to carry digital audio; and playing both of the digital audio data and audio data from a wagering game audio source during game play of the wagering game on the wagering game machine; and determining a played volume of the digital audio data and a played volume of the audio data from the wagering game audio source in accordance with a game play period.

9. The method of claim 8, wherein the digital audio format link is AES/EBU.

10. The method of claim 8, wherein the digital audio format link is SPDIF.

11. The method of claim 8, wherein the digital audio format link is HDMI.

12. The method of claim 8, wherein the digital audio format link is I2S.

13. The method of claim 8, wherein the audio module comprises analog-to-digital converter in the digital audio format link operable to convert an analog signal received in the audio module to a digital audio format signal.

14. The method of claim 8, wherein the audio module comprises a digital-to analog converter in the digital audio format link operable to convert a digital signal received from the audio module to an analog signal.

15. The method of claim 8, wherein the external audio device comprises a personal audio player device and further comprising:

determining that a wagering game user is to be awarded digital audio content; and transferring digital audio content to the personal audio player device.

16. The method of claim 15, wherein determining that the wagering game user is to be awarded digital audio content is based on one or more of number of credits played or time played.

17. The method of claim 15, wherein the digital audio content is selected from a set of digital audio content that is consistent with a theme of the wagering game.

18. The method of claim 8, wherein the external audio device comprises a personal audio player device and further comprising transferring digital audio content from the personal audio player device to the computerized wagering game system.

19. The computerized wagering game system of claim 1, wherein the external audio device comprises a personal audio player device coupled to the wagering game system.

20. The computerized wagering game system of claim 1, wherein the game play period comprises a bonus sound or an instructional sound and wherein the audio module is configured to decrease the volume of the digital audio data during such sound.

21. The computerized wagering game system of claim 1, wherein the game play period comprises a period of less active game play and wherein the audio module is configured to increase the volume of the digital audio data during such sound.

22. The method of claim 8, wherein the game play period comprises a bonus sound or an instructional sound and wherein the audio module is configured to decrease the volume of the digital audio data during such sound.

23. The method of claim 8, wherein the game play period comprises a period of less active game play and wherein the audio module is configured to increase the volume of the digital audio data during such period.

24. The computerized wagering game system of claim 1, wherein the digital audio format link is carried by a digital audio-specific electrical connection or a digital audio-specific optical connection.

25. The computerized wagering game system of claim 1, wherein the digital audio format link is carried by a general-purpose electrical connection or a general-purpose optical connection.

26. The computerized wagering game system of claim 1, wherein the volume of the digital audio data and the volume of the audio data from the wagering game audio source is determined in response to an event in the game play of the wagering game.

27. The computerized wagering game system of claim 1, wherein the game play of the wagering game comprises a plurality of game play periods.

28. The method of claim 8, wherein the digital audio format link is carried by a digital audio-specific electrical connection or a digital audio-specific optical connection.

29. The method of claim 8, wherein the digital audio format link is carried by a general-purpose electrical connection or a general-purpose optical connection.

30. The method of claim 8, wherein the volume of the digital audio data and the volume of the audio data from the wagering game audio source is determined in response to an event in the game play of the wagering game.

31. The method of claim 8, wherein the game play of the wagering game comprises a plurality of game play periods.

32. The computerized wagering game system of claim 1, wherein the digital audio format link is a USB link.

33. The method of claim 8, wherein the digital audio format link is a USB link.

34. The computerized wagering game system of claim 1, wherein the audio module is further operable to exchange digital audio data with the external audio device over the digital audio format link.

35. The method of claim 8, further comprising exchanging digital audio data with the external audio device over the digital audio format link.

36. A computerized wagering game system, comprising:

a gaming module comprising a processor and a machine readable storage medium storing instructions which when executed on the processor are operable to present a wagering game on which monetary value can be wagered; and an audio module configured to:

receive audio data from a wagering game audio source;

receive digital audio data from an external audio device over a digital audio format link suitable to carry digital audio data;

play both the digital audio data received over the digital audio format link suitable to carry digital audio data and the audio data from a wagering game audio source during game play of the wagering game; and adjust a ratio of a played volume of the digital audio data to a played volume of the audio data from the wagering game audio source in response to an event in the game play of the wagering game.

37. A method of operating a computerized wagering game machine, comprising:

presenting a wagering game on which monetary value can be wagered;

receiving audio data from a wagering game audio source;

receiving digital audio data from an external audio device over a digital audio format link suitable to carry digital audio data;

playing both the digital audio data received over the digital audio format link suitable to carry digital audio data and the audio data from a wagering game audio source during game play of the wagering game; and adjusting a ratio of a played volume of the digital audio data to a played volume of the audio data from the wagering game audio source in response to an event in the game play of the wagering game.

* * * * *